US010124903B2

(12) United States Patent
Jamot

(10) Patent No.: US 10,124,903 B2
(45) Date of Patent: Nov. 13, 2018

(54) ROTORCRAFT HAVING ELECTRICAL EQUIPMENT FOR REGULATING ELECTRICAL POWER SUPPLY TO AN ENGINE ON STARTING

(71) Applicant: AIRBUS HELICOPTERS, Marignane (FR)

(72) Inventor: Michel Jamot, Aix en Provence (FR)

(73) Assignee: Airbus Helicopters, Marignane (FR)

( * ) Notice: Subject to any disclaimer, the term of this patent is extended or adjusted under 35 U.S.C. 154(b) by 225 days.

(21) Appl. No.: 14/989,827

(22) Filed: Jan. 7, 2016

(65) Prior Publication Data

US 2016/0200444 A1 Jul. 14, 2016

(30) Foreign Application Priority Data

Jan. 8, 2015 (FR) ...................................... 15 00022

(51) Int. Cl.
| | | |
|---|---|---|
| *B64D 31/02* | (2006.01) | |
| *B64D 27/12* | (2006.01) | |
| *B64C 27/12* | (2006.01) | |
| *F01D 19/00* | (2006.01) | |
| *H02J 7/14* | (2006.01) | |
| *H02J 7/34* | (2006.01) | |

(52) U.S. Cl.
CPC .............. *B64D 31/02* (2013.01); *B64C 27/12* (2013.01); *F01D 19/00* (2013.01); *H02J 7/1423* (2013.01); *H02J 7/34* (2013.01); *Y02T 50/671* (2013.01)

(58) Field of Classification Search
CPC ......... B64D 31/02; B64C 27/12; F01D 19/00; Y02T 50/671; H02J 7/1423; H02J 7/34

USPC ........ 60/778, 786, 39.13; 244/53 A; 307/10, 307/10.6
See application file for complete search history.

(56) References Cited

U.S. PATENT DOCUMENTS

| | | | | |
|---|---|---|---|---|
| 6,233,935 B1 | | 5/2001 | Kahlon et al. | |
| 6,321,707 B1 * | | 11/2001 | Dunn | .................. F02N 11/0866 |
| | | | | 123/179.3 |
| 6,945,030 B2 * | | 9/2005 | Hirayama | ................. F02C 9/28 |
| | | | | 60/39.27 |

(Continued)

FOREIGN PATENT DOCUMENTS

| | | |
|---|---|---|
| EP | 2264297 | 12/2010 |
| FR | 2858484 | 2/2005 |

OTHER PUBLICATIONS

French Search Report for French Application No. FR 1500022, Completed by the French Patent Office on Nov. 3, 2015, 7 Pages.

(Continued)

*Primary Examiner* — Dinh T Le
(74) *Attorney, Agent, or Firm* — Brooks Kushman P.C.

(57) ABSTRACT

A rotorcraft having at least one turboshaft engine with an electric starter powered from the onboard network that makes use of a battery and of a discharge module made up of a plurality of discharge members connected in series. An electric circuit comprises a regulator device for regulating a main bidirectional DC-DC static converter connected in series with the discharge module. The regulator device maintains equivalence between the current of the electric circuit and the current of the onboard network, regardless of the mode of operation of the discharge module, and does so by monitoring the voltage of the discharge module and the voltage of the onboard network.

20 Claims, 1 Drawing Sheet

(56) References Cited

U.S. PATENT DOCUMENTS

| | | | | |
|---|---|---|---|---|
| 8,752,392 B2* | 6/2014 | Gazzino | ............... | F02C 7/26 60/787 |
| 2002/0063479 A1 | 5/2002 | Mitchell et al. | | |
| 2004/0080165 A1 | 4/2004 | Geis et al. | | |
| 2008/0211237 A1* | 9/2008 | Berenger | ............... | H02J 3/12 290/40 B |
| 2013/0264868 A1 | 10/2013 | Higaki et al. | | |

OTHER PUBLICATIONS

Canadian Office Action and English machine translation for Application No. 2,915,868, dated Jun. 20, 2017, 9 pages.

* cited by examiner

ROTORCRAFT HAVING ELECTRICAL EQUIPMENT FOR REGULATING ELECTRICAL POWER SUPPLY TO AN ENGINE ON STARTING

CROSS REFERENCE TO RELATED APPLICATION

This application claims priority to French patent application No. FR 15 00022 filed on Jan. 8, 2015, the disclosure of which is incorporated in its entirety by reference herein.

BACKGROUND OF THE INVENTION (1) Field of the Invention

The invention relates to the field of rotorcraft, and it relates more particularly to ways of electrically powering a turboshaft engine of a rotorcraft while it is being started.

In this field, several documents have been consulted, including those discussed below.

(2) Description of Related Art

In addition to Document U.S. Pat. No. 8,752,392, discussed in greater detail below, the following documents have also been taken into consideration: US 2002/063479, FR 2 858 484, US 2004/080165, and U.S. Pat. No. 6,233,935.

Document US 2002/063479 describes a turbogenerator having a compressor configured to compress a fuel oxidizer, and a combustion chamber connected to an exhaust of the compressor and configured to receive both the fuel and the oxidizer. A carburetor is configured to control the size of fuel droplets supplied to the combustion chamber in order to prevent flameout of the turbogenerator. A turbine is connected to the exhaust and configured to convert heat from the combustion gas into rotational energy. A motor/generator is configured to convert the rotational energy into electrical energy. A common shaft connects together the turbine, the compressor, and said motor/generator. A power controller is configured to control: a delivery pressure to the carburetor; a first fuel injection mechanism having a variable orifice; a second fuel injection system configured with separate injectors; a fuel heater mechanism; a cooler mechanism configured to cool the fuel; and an electric field inside the combustion chamber.

Document FR 2 858 484 describes an electrical power supply system for a vehicle that includes a battery. A step-up circuit raises the voltage delivered by the battery to a high voltage and delivers electrical energy at high voltage to an electrical power supply connection. A capacitor has a first terminal connected to the battery and a second terminal connected to the output terminal of the step-up circuit in order to store a fraction of the energy delivered by the step-up circuit so as to increase an electrical potential difference between the terminals up to a value that is equal to a difference between the high voltage and the source voltage. A control device controls the step-up circuit so that it delivers electrical energy to the power supply connection and to the capacitor at the high voltage matching a desired voltage higher than the source voltage.

Document US 2004/080165 describes a control arrangement for a turbogenerator/motor of a hybrid vehicle. For connection to an alternating current (AC) network, the arrangement has an AC generator, a turbine functionally connected to the generator, a first converter functionally connected to the generator, a second converter operationally connected between the first converter and an electricity distribution interface; and a direct current (DC) bus functionally connected to the first and second converters. Energy is delivered to the bus via the second converter in a first mode of operation of the turbogenerator, and power is delivered to the bus by the first converter in a second mode of operation of the turbogenerator. The voltage of the bus is controlled by the first converter in the second mode. The AC generator forms part of a permanent magnet generator or an induction generator. A proportional integral speed controller provides for a sampling time that is longer than the sampling time of a proportional integral power controller.

Document U.S. Pat. No. 6,233,935 describes controlling the starting of an internal combustion engine for an automotive vehicle. The starter is coupled to the engine crank shaft and a turbocharger that is provided with a turbine, the control makes provision for rotating the crank shaft with the starter in order to move the pistons that are coupled to the crank shaft, to use the air that is moved by those pistons for turning the turbine, and to cause the engine to start when the turbocharger reaches a predetermined speed. The speed of the turbocharger is deduced by measuring the time interval during which the pistons have been moving air. The starter is a starter/alternator.

The present invention relates more particularly to a rotorcraft having an electric circuit. The electric circuit regulates the supply of electrical power to a rotorcraft turboshaft engine while it is being started by taking electricity from various electrical energy sources powering an onboard electricity network of the rotorcraft, referred to below as the "onboard network".

Such diversified sources of electrical energy comprise in particular at least one main source for generating DC and at least one secondary source formed by at least one electrical energy storage module made up of discharge members.

Rotorcraft are rotary wing aircraft in which the mechanical power needed to operate the rotorcraft is supplied essentially by one or more engines, in particular turboshaft engines.

It should be recalled that in general terms a turboshaft engine comprises in succession: a gas compressor; a combustion chamber for burning a fuel; and a turbine. When starting the engine, the gas generator generates air under pressure that is raised in temperature in the combustion chamber in order to drive the turbine in rotation. During sustained operation of the engine, the gas compressor is driven in rotation by the turbine.

There arises the problem of driving the engine on starting until a threshold is reached that enables the turbine to be driven in rotation sufficiently to enable the engine to operate in self-sustained manner.

For this purpose, the engine is provided with an auxiliary electric motor or starter for driving the gas turbine until reaching said rotary drive threshold of the turbine.

More precisely, the starter drives the gas compressor mechanically until an appropriate compression threshold is reached to enable fuel to be injected and the igniter circuit of the engine to be in operation. The starter is then kept in operation until a speed of rotation is reached for the turbine that is sufficient to enable the engine to sustain its own operation.

While starting the engine, the starter is powered electrically from the onboard network, which is maintained at a setpoint voltage, which by way of indication may be about twenty-eight volts (V).

The electrical energy powering the starter is supplied by at least one main electrical energy source powering the onboard network, referred to below as the "main" source. Such a main source is either an onboard source of electrical energy, in particular as constituted by at least one battery and/or an electric machine of the rotorcraft, or else an electrical energy source that is external to the rotorcraft and that is used on the ground in order to activate the starter.

In this context, it is necessary to supply sufficient electrical energy to the starter for driving the gas compressor while starting the engine against a resisting torque that is opposed by the turbine while it is being set into rotation, and to do this until the gas compressor is being driven at a speed that enables sustained operation of the engine.

Nevertheless, the supply of electrical energy from a main source comprising one or more batteries on board the rotorcraft may not suffice for driving the starter while starting the engine, particularly in the event of the battery (ies) being used at temperatures that are very low or if the battery(ies) is/are discharged.

Consequently, in order to supply electrical power for starting the engine from batteries on board the rotorcraft, it is necessary for the batteries to have a comfortable reserve of energy.

Nevertheless, fitting a rotorcraft with batteries of dimensions suitable for providing such a comfortable amount of energy presents the drawback of increasing the weight, the overall size, and also the number of batteries on board. Such provisions present the drawback of increasing the load carried by the rotorcraft, which is to be avoided.

Under such circumstances, proposals have been made to power the starter with electrical energy taken not only from said main source but also from a secondary source of electrical energy, referred to below as the "secondary" source, that is made up of a plurality of discharge members.

Such discharge members are suitable for providing the starter with a short high-power pulse of additional electrical energy in addition to the electrical energy being supplied by the main source.

Discharge members are electrical components that present the advantage of storing a large quantity of electrical energy in a small volume, and of being capable of restoring said electrical energy over a period that is short, of the order of a few seconds.

It may be recalled that the discharge members are generally conventional supercapacitors arranged to deliver electrical energy at a power intermediate between the electrical powers that can be supplied respectively by a battery and by electrolytic capacitors.

On this topic, reference may be made to Document EP 2 264 297 or U.S. Pat. No. 8,752,392 which describes ways of supplying electrical energy to the starter of a rotorcraft engine, while making use of a "main" source and a "secondary" source, itself made up of a module comprising a plurality of discharge members, referred to as a "discharge" module.

More particularly, Document U.S. Pat. No. 8,752,392 proposes using a discharge module to provide the onboard network, while starting the engine, with additional electrical energy supplementing the electrical energy supplied by the main source. A bidirectional direct current-direct current (DC-DC) converter regulates the operation of the discharge module as a function of the electrical energy needs of the starter as determined by the value of at least one parameter identifying progress in the starting of the engine.

It has been found in practice that the techniques described in Document U.S. Pat. No. 8,752,392 for supplying electrical energy to a starter of a rotorcraft engine leave room for improvement.

More particularly, it has been found useful to organize as well as possible the exchanges of electrical energy between the onboard network and the various sources of electrical energy that are used for supplying electrical energy to the starter while it is starting the engine.

In this context, the safety and the availability of the onboard network must not be affected by the techniques used for regulating the supply of electrical energy to the starter, in particular firstly as a result of delivering electrical energy from the discharge members into the onboard network, and secondly as a result of recharging the discharge members with electrical energy from the onboard network.

In addition, such regulation must be compatible with constraints associated with maintaining stable DC in the onboard network, given the way the electrical energy supplied by the onboard network is used by other rotorcraft equipment that consumes electrical energy.

Furthermore, it should not be forgotten that it is appropriate to organize such regulation while taking account of the constant desire in aviation to reduce the weight and the size of equipment on board a rotorcraft.

BRIEF SUMMARY OF THE INVENTION

In this context, the object of the present invention is to propose a rotorcraft having electrical equipment that serves to regulate the supply of electrical energy to a starter of an engine of the rotorcraft from an onboard network of the rotorcraft. This object is achieved by the subject matter of claim 1.

The present invention seeks to find such regulation more specifically in the context of supplying electrical energy to the starter from the onboard network by making use of a variety of sources of electrical energy.

Said diverse sources of energy comprise in particular at least one said main source delivering DC to the onboard network and having at least one said discharge module delivering high power electricity into the onboard network under the control of a bidirectional DC-DC converter that also serves to recharge the discharge module from the onboard network.

The present invention seeks more particularly to organize said electrical equipment in such a manner as to optimize the use of the electrical energy stored by the discharge members when putting the starter into operation, while ensuring that the onboard network is kept safe and protected at a setpoint voltage.

The invention seeks to do this in the context of the above-mentioned constraints, in particular relating to reducing as much as possible the weight on board the rotorcraft and to protecting the onboard network, which also powers other electricity-consuming equipment of the rotorcraft.

In the context of seeking to perform such regulation in compliance with the present invention, it has been found more particularly:

that in the context of the discharge module and the main source being connected in parallel, the possibilities for optimally dimensioning the discharge module are limited because of the limited voltage that is acceptable by the onboard network and by the starter. As an indication, a discharge module that is initially charged to 28 V, and that has a voltage at the end of discharge of 18 V, has only 58% of its energy capacity used. It is consequently appropriate to seek to optimize the dimensioning of the discharge module on condition of making best use of its electrical energy resources;

that in the context of the discharge module and the main source being connected in series, it is advantageously possible to make full use of the electrical energy stored in the discharge members. Nevertheless, such a solution involves greater complexity in the organization and the operation of the onboard network, which it is desirable to avoid;

that the high level of current delivered by the discharge module while starting the engine leads to difficulties in dimensioning the members for electrically protecting the onboard network;

that the electrical energy delivered by the discharge module while starting the engine can lead to high-current transients being supplied to the starter, and consequently to peaks in electromotive torque that can be harmful for the lifetime of the mechanical members of the engine, its turbine in particular.

On the basis of the above observations, the present invention seeks to make use of a bidirectional DC-DC converter of static type, referred to as the "main" static converter, that is connected in series with the discharge module in order to regulate its operation.

Furthermore, a device for regulating the operation of said main static converter maintains current equivalence between the current supplied to the onboard network by the discharge module and the current from the onboard network itself. Such regulation of the operation of the main static converter is performed in particular on the basis of the regulator device monitoring firstly the voltage of the electrical energy stored by the discharge module and secondly the voltage of the onboard network.

On the basis of specific control relationships for controlling the operation of said main static converter as implemented by the regulator device, the efficiency of the energy transfer between the discharge module and the onboard network can be optimized, while maintaining the voltage of the onboard network at the levels required by the various consumers of electrical energy that are powered by the onboard network.

Such optimization of said energy transfer makes it possible to optimize the use made of the electrical energy stored by the discharge module, potentially using all of it, and also to achieve fast recharging of the discharge module at an appropriate moment.

Furthermore, the bulk and the weight of the various electrical energy sources used for supplying the required electrical energy to the starter can be limited more effectively without affecting the delivery of the electrical energy needed by the starter for driving the turbine, and this can be achieved without penalizing either the onboard network delivering the electrical energy needed for the various electrical energy consumers of the rotorcraft, or the protection of the onboard network against voltage surges.

Furthermore, other than while starting the engine, the electrical energy stored by the discharge module can be used under the control of the regulator device, to supply electrical energy to the onboard network, should that be necessary, in the event of a significant drop in network voltage.

More particularly, a rotorcraft in accordance with the present invention has at least one turboshaft engine comprising a gas compressor and a turbine. The engine may equally well be of the linked turbine type in which the turbine is linked to rotate with the gas compressor by a working shaft, or of the free turbine type, in which the gas compressor and the turbine are linked to respective different shafts.

The engine is provided with a starter for use, while starting the engine, to drive the gas compressor, and consequently drive the turbine. Running the starter depends on an electric circuit that is connected via a connection bus to an onboard DC electricity network, referred to as the onboard network, that is maintained at a setpoint voltage.

Said electric circuit regulates the supply of electrical power to the starter from various electrical energy sources, including at least a main electrical energy source delivering DC, referred to as the "main" source, and at least one secondary source of electrical energy formed by at least one module combining discharge members, referred to as the "discharge" module.

The operation of the discharge module depends on a bidirectional DC-DC converter having two modes of operating the discharge module, a "discharging" mode of operation and a "recharging" mode of operation.

In said discharging mode, the bidirectional DC-DC converter controls the delivery into the onboard network of electrical energy stored in the discharge module, as a function of the value of at least one parameter identifying progress in starting the engine.

These provisions are such that the electrical energy delivered by the discharge module, while starting the engine, supplies additional electrical energy to the onboard network supplementing the electrical energy supplied to the onboard network by said at least one main source.

In said recharging mode, the bidirectional DC-DC converter regulates recharging of the discharge module from the onboard network, using electricity supplied by said main source.

In this context, the rotorcraft of the present invention is recognizable mainly in that said electric circuit includes the discharge module and is connected in parallel with the main source.

In addition, the discharge members are connected in series in the discharge module, which is itself connected in series with bidirectional DC-DC converter in the electric circuit.

Furthermore, said bidirectional DC-DC converter is more specifically constituted by a bidirectional DC-DC static converter, referred to below as the "main" static converter, comprising an electrical power architecture and an N-phase chopper with phases mutually shifted by 2 n/N.

Furthermore, a regulator device controls the operation of said electrical power architecture of the main static converter. The regulator device at least maintains current equivalence between the current of the electric circuit and the current of the onboard network, regardless of the mode of operation of the discharge module, and does so by monitoring the voltage of the discharge module and the voltage of the onboard network.

More specifically, the regulator device includes a primary regulation loop controlling said current equivalence, as a function of secondary regulation loops identifying respectively at least the voltage of the onboard network and the voltage of the discharge module.

Such a primary regulation loop provides the onboard network and/or the electronic members of the main static converter with protection. In addition, the primary regulation loop improves the stability of the onboard network, in particular in terms of keeping its voltage stable.

Preferably, the electric circuit includes a bistable enabling the discharging mode and the recharging mode of the discharge module to be activated selectively by the static converter. The bistable is spontaneously in its position for authorizing activation of the recharging mode and it is controlled to occupy its position for authorizing activation of the discharging mode on receiving data relating to activating engine starting, in particular from crew on board the rotorcraft.

More particularly, in recharging mode, the primary regulation loop is controlled by a first said secondary regulation loop regulating the voltage of the discharge module.

Still more particularly, in discharging mode, the primary regulation loop is controlled by a second said secondary regulation loop complying with a reference voltage to regulate the voltage of the electricity delivered by the electric circuit to the onboard network via said connection bus.

The primary regulation loop maintains the onboard network at a voltage suitable for enabling the starter to be operated at a required torque for driving the turbine as a function of the value of said at least one parameter identifying progress in starting the engine.

For example, reference voltage is a predefined fixed value identified depending on the torque that needs to be developed by the starter in compliance with its technical characteristics.

Such provisions enable the starter to supply said torque for driving the turbine that is required for driving the gas compressor of the engine as a result of a suitable choice for the value of said reference voltage.

Also by way of example and preferably, the reference voltage is identified by a third secondary regulation loop taking account equally well of the torque and/or the speed of rotation of the starter at an instant under consideration and/or the current delivered to the starter by the onboard network.

The third secondary regulation loop identifying the value of the reference voltage enables the electrical energy necessary for the starter to be supplied specifically as a function of its electrical energy requirements for driving the turbine while starting the engine.

In addition, during starting of the engine, the delivery of electrical energy by the discharge module is optimized while preserving the onboard network from a voltage surge.

In an embodiment, the regulator device includes a function of inhibiting said chopper providing a voltage of the discharge module is in compliance with a voltage lying within a predetermined range of acceptable values, in particular concerning protection of the onboard network against excess voltage.

By way of example, the chopper of the main static converter has N phases constituted by static power switches operated in interleaved mode, in order to make best use of the weight and the volume of the filter members of the chopper.

In a variant, the chopper of the main static converter has N phases constituted by staged high frequency transformers. Electrical isolation is then preferably interposed between the discharge module and said connection bus. Such electrical isolation serves to optimize freedom to select the voltage of the discharge module depending on the structural complexity of the main static converter.

In an embodiment, a bidirectional DC-DC static converter referred to as a "secondary" static converter is interposed between the main source and the onboard network. The secondary static converter regulates the voltage of the electricity delivered by the main source in compliance with a setpoint voltage of the onboard network.

The secondary static converter makes it possible to optimize the use made of the volume and the weight of the electrical energy storage members both in the main source and in the discharge module. The engine may be started using a small number of discharge members incorporated in the discharge module.

The secondary static converter makes it possible to use a low voltage main source, in particular while starting the engine, because of the ability of the secondary static converter to adapt the voltage of the electrical energy delivered by the main source depending on the electrical energy requirements of the onboard network, and more particularly depending on the electrical energy requirements of the members that consume electrical energy and that are powered by the onboard network.

The discharge module and the main static converter are potentially grouped together in a common first electrical component. The regulator device and the main static converter are likewise potentially incorporated in a common second electrical component.

In a preferred embodiment, the discharge module, the main static converter, and the regulator device are grouped together in a common piece of electrical equipment.

Said at least one parameter identifying progress in starting the engine is preferably any one of at least the following parameters: at least one parameter identifying the speed of rotation of the starter and/or the speed at which the turbine is driven in rotation; a parameter identifying the resisting torque opposed by the turbine against being rotated by the starter; and a parameter identifying the current delivered to the starter by the onboard network.

Furthermore, it is preferable to place a contactor in the electric circuit to isolate the discharge module from the onboard network. Such a contactor may equally well be an electromechanical contactor or a static contactor. The contactor may be activated in particular by crew on board the rotorcraft and/or by the regulator device in the event of detecting a voltage surge in the onboard network.

Such provisions seek to protect the onboard network from a potential voltage surge under the effect of the electric circuit delivering the electrical energy stored in the discharge module to the onboard network.

It should be observed that the discharge module and/or the main source, in particular when the main source is constituted by at least one battery dedicated to starting the engine, are advantageously members that are removably mounted on board the rotorcraft so as to allow them to be removed after the engine has started, thereby reducing the load carried by the rotorcraft in flight.

Among the advantages provided by the present invention, the following advantages are mentioned in particular.

It is possible to use almost all of the electrical energy stored by the discharge module as a result of the control performed by the regulator device on the operation of the main static converter. This enables the weight, the volume, and the cost of providing the discharge module to be used to better effect.

The electrical energy supplied by the discharge module may be delivered while starting the engine under the control of the main static converter, which in operation, under regulation from the regulator device, makes the following possible:

control over the voltage of the onboard network to match a required voltage threshold as a function of the torque developed by the starter and/or as a function of the drive speed of the starter, preferably both considered in combination; and control over the torque developed by the starter on the basis of the values of calculation parameters that are easily accessible, such as for example the current delivered to the starter by the onboard network.

In addition, the primary regulation loop may be a fast regulation loop providing the main static converter with protection and providing voltage stability for the onboard network while the discharge module is delivering electrical energy under the control of the main static converter having its operation regulated by the regulator device.

Such a fast regulation loop also enables the discharge module to be recharged quickly, over a duration of the order of a few tenths of a second.

The advantages procured by the present invention are obtained in particular without increasing the weight of the main static converter compared with certain prior art converters calibrated for recharging the discharge module quickly.

Furthermore, the electric circuit may easily be retrofitted to an existing onboard network, without major modification to the existing onboard network.

The electric circuit is also suitable for providing the starter with the electrical energy it needs for driving the turbine while starting the engine, even at low temperatures that might reduce the ability of a battery constituting the main source to deliver electricity at suitable voltage, and this applies regardless of the number of starters that are respectively fitted to a plurality of engines of the rotorcraft.

In addition, the electrical energy stored by the discharge module may be used in flight for providing additional energy to the onboard network, should that be necessary, in particular as a function of the electrical energy required at a given instant by the various electrical energy consumers that are powered by the onboard network.

BRIEF DESCRIPTION OF THE SEVERAL VIEWS OF THE DRAWINGS

An embodiment of the present invention is described with reference to the figures of the accompanying sheet, in which.

DETAILED DESCRIPTION OF THE INVENTION

Figures 1, 2:
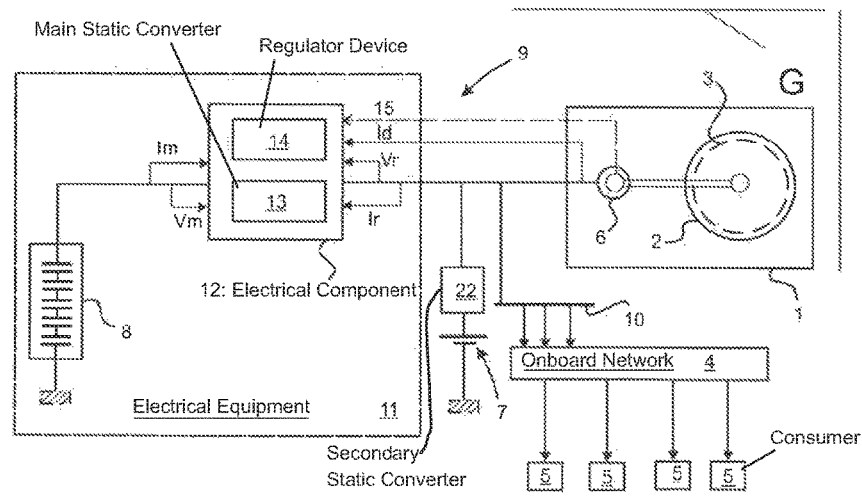
FIG. 1 is a diagram showing electrical equipment of a rotorcraft in accordance with the present invention suitable for regulating the delivery of electrical energy to the starter of a turboshaft engine while starting.
FIG. 2 is a diagram showing details of an embodiment of the electrical equipment shown in FIG. 1.

In FIGS. 1 and 2, a rotorcraft is represented by reference G. The rotorcraft G has at least one turboshaft engine 1 that provides the rotorcraft with the mechanical power needed to operate it. The engine 1 conventionally comprises a gas compressor 2 and a turbine 3.

When starting the engine 1, the gas compressor 2 generates air under pressure that has its temperature raised in a combustion chamber in order to drive the turbine 3 in rotation. During sustained operation of the engine 1, the gas compressor 2 is driven in rotation by the turbine 3.

Furthermore, the rotorcraft has an onboard network 4 enabling DC electricity to be delivered to various consumers 5 of electricity in the rotorcraft. The onboard network 4 provides electricity at a setpoint voltage, which by way of indication is about 28 V.

Starting of the engine 1 is initiated by a starter 6 constituted by an auxiliary electric motor powered electrically from the onboard network 4. While starting the engine 1, the starter 6 serves to drive the gas compressor 2 until it reaches a threshold that is sufficient for driving the turbine 3 in order to enable sustained operation of the engine 1.

The starter 6 is powered electrically by using a main electricity source 7 and a secondary electricity source 8.

The main source 7, which may be formed by a battery as in the example shown, delivers DC to the onboard network 4 at said setpoint voltage.

The secondary source is constituted by at least one discharge module 8 comprising a plurality of discharge members connected in series. By way of indication, the discharge members may for example be grouped together in groups of twelve, each having an individual capacitance of the order of 3000 farads (F), at a unit voltage of about 2.7 V.

In this context, the rotorcraft has an electric circuit 9 connected to the onboard network 4 via a connection bus 10.

Said electric circuit 9 includes electrical equipment 11 combining the discharge module 8 together with an electrical component 12 incorporating a main bidirectional DC-DC static converter 13 and a regulator device 14 for regulating the operation of the main static converter 13.

The main static converter 13 comprises an electrical power architecture with an N-phase chopper 13', with the phases preferably being mutually shifted by 2 n/N. The main static converter 13 is connected in series between the electric circuit 9 and the discharge module 8.

With its operation being regulated by the regulator device 14, the main static converter 13 serves firstly to deliver the electrical energy stored by the discharge module 8 to the onboard network 4, and secondly to recharge the discharge module 8 with electrical energy from the onboard network 4.

The regulator device 14 regulates the operation of the main static converter 13 as a function of the value of at least one parameter 15 specifying progress while starting the engine 1, such as for example the torque developed by the starter 6 and/or its speed of rotation, or indeed as a function of the electric current Id delivered to the starter 6 by the onboard network 4.

Furthermore, the regulator device 14 monitors the characteristics of the electrical energy stored in the discharge module 8 (voltage Vm and current Im) and the characteristics of the electric current from the onboard network 4 (voltage Vr and current Ir).

On the basis of such monitoring, the regulator device 14 maintains equivalence between the current Ir from the onboard network 4 and the current delivered by the electric circuit 9 to the onboard network 4 by using the electrical energy stored in the discharge module 8 under the control of the main static converter 13, itself being dependent on the regulator device 14.

In FIG. 2, more particularly, the regulator device 14 can be seen to comprise a primary regulation loop 16 controlling said current equivalence as a function of the voltage Vr of the onboard network 4 and of the voltage Vm of the discharge module 8. The operation of the primary regulation loop 16 is dependent on a plurality of secondary regulation loops.

A first secondary regulation loop 17 monitors the voltage Vm of the discharge module 8 while being recharged with electrical energy from the onboard network 4. A second secondary regulation loop 18 monitors the voltage Vb of the electricity delivered by the first connection bus 10 to the onboard network 4, in compliance with a reference voltage.

The reference voltage is potentially a value that is predefined depending on the technical characteristics of the starter 6.

In the example shown, the reference voltage is identified by a third secondary regulation loop 19 that takes account of the torque Cd developed by the starter 6 and/or of its speed of rotation Rd, or indeed of the current Id delivered to the starter 6 by the onboard network 4.

The electric circuit 9 includes a bistable 20 interposed between the secondary regulation loops 17, 18, and 19 and the primary regulation loop 16. The bistable 20 serves to select between recharging the discharge module 8 from the onboard network 4, and conversely delivering the electrical energy stored by the discharge module 8 to the onboard network 4, passing via the main static converter 13 under the control of the regulator device 14.

The bistable 20 is spontaneously maintained in its position for recharging the discharge module 8, and it is operated to allow the electrical energy stored in the discharge module 8 to be delivered, with the bistable 20 being operated by receiving data 21 for activating the starting of the engine 1.

The main source 7 constituted by the battery is preferably provided with a secondary bidirectional DC-DC static converter 22 controlling the operation of said battery. More particularly, the secondary static converter 22 controls firstly the delivery of electrical energy from the main source 7 to the onboard network 4 at its setpoint voltage, and secondly recharging of the main source 7 from the onboard network 4.

In an embodiment, the discharge members, and in particular at least the module 8, form at least a portion of an accessory that is removably connected to the network 4. In this example, the term "accessory" means that the facility is provided to install or not to install a group of discharge members on the network, without affecting the electrical continuity of the network that is necessary to enable it to operate, in particular in the event of a module being removed. Such an accessory may be installed and used in optional manner depending on requirements, being installed on board the rotorcraft G when necessary, e.g. because of low temperatures. When the accessory is not essential, it may be removed from the network without affecting its operation so as to avoid the helicopter carrying an unnecessary load.

What is claimed is:

1. A rotorcraft having an electric circuit and at least one turboshaft engine comprising a gas compressor and a turbine, the engine being provided with a starter for driving the gas compressor while starting the engine, the electric circuit being connected via a connection bus to an onboard electricity network for delivering DC to operate the starter under dependency of the electric circuit, the onboard electricity network being maintained at a setpoint voltage during starting by regulating the delivery of electrical energy to the starter by the electric circuit from a main source of electrical energy and a secondary source of electrical energy, the main source of electrical energy for delivering DC to the onboard network, the secondary source operable in first and second modes depending on a bidirectional DC-DC converter:

wherein the first mode is a "discharge" mode of operating the secondary source in which the bidirectional DC-DC converter controls the delivery of electrical energy from the secondary source as a function of a value of at least one parameter identifying progress in starting the engine, such that additional electrical energy is delivered by the secondary source to the onboard network while starting the engine to supplement the electrical energy supplied to the onboard network by the main source; and wherein the second mode is a "recharging" mode of operating the secondary source in which the bidirectional DC-DC converter regulates recharging of the secondary source from the onboard network with electrical energy supplied by the main source;

the secondary source of the electric circuit is connected in parallel with the main source, wherein the secondary source comprises a discharge module having a plurality of discharge members that are connected in series; the discharge module being connected in series with the electric circuit via the bidirectional DC-DC converter;

the bidirectional DC-DC converter being a main static converter comprising at least an electrical power architecture and an N phase chopper with phases mutually shifted by $2\pi/N$; and a regulator device comprises a primary regulation loop and controls the operation of the electrical power architecture of the main static converter, at least by maintaining current equivalence between a current of the electric circuit and a current of the onboard network, regardless of the mode of operation of the discharge module and by monitoring the voltage of the discharge module and the voltage of the onboard network.

2. A rotorcraft according to claim 1, wherein the regulator device includes secondary regulation loops in addition to the primary regulation loop that controls the current as a function of the secondary regulation loops respectively identifying at least the voltage of the onboard network and the voltage of the discharge module.

3. A rotorcraft according to claim 1, wherein the electric circuit includes a bistable for selectively activating the discharge mode and activating the recharging mode of the discharge module by means of the main static converter, the bistable spontaneously being in a first position for activating the recharging mode and being controlled to take up a second position for activating the discharging mode on receiving data relating to activating engine starting.

4. A rotorcraft according to claim 2, wherein in recharging mode, the primary regulation loop is controlled by a first secondary regulation loop regulating the voltage of the discharge module.

5. A rotorcraft according to claim 2, wherein in discharging mode, the primary regulation loop is controlled by a second secondary regulation loop complying with a reference voltage to regulate the voltage of the electricity delivered by the electric circuit to the onboard network via the connection bus, the primary regulation loop maintaining the onboard network at a voltage suitable for enabling the starter to be operated at a required torque for driving the turbine as a function of the value of the at least one parameter identifying progress in starting the engine.

6. A rotorcraft according to claim 5, wherein the reference voltage is a predefined fixed value identified depending on the required torque to be developed by the starter for driving the turbine and starting the engine.

7. A rotorcraft according to claim 5, wherein the reference voltage is identified by a third secondary regulation loop taking account equally well of the torque and/or the speed of rotation of the starter at an instant under consideration and/or the current delivered to the starter by the onboard network.

8. A rotorcraft according to claim 1, wherein the regulator device includes a function of inhibiting the chopper providing a voltage of the discharge module is in compliance with a voltage lying within a predetermined range of acceptable values.

9. A rotorcraft according to claim 1, wherein the N phase chopper of the main static converter has N phases constituted by static power switches operated in interleaved mode.

10. A rotorcraft according to claim 1, wherein the N phase chopper of the main static converter has N phases constituted by staged high frequency transformers with electrical isolation being interposed between the discharge module and the connection bus.

11. A rotorcraft according to claim 1, wherein another bidirectional DC-DC static converter constituting a secondary static converter is interposed between the main source and the onboard network; the secondary static converter regulating a voltage of electricity delivered by the main source to be in compliance with a setpoint voltage of the onboard electricity network.

12. A rotorcraft according to claim 1, wherein the discharge module and the main static converter are grouped together in a common first electrical component.

13. A rotorcraft according to claim 1, wherein the regulator device and the main static converter are incorporated in a common second electrical component.

14. A rotorcraft according to claim 1, wherein the discharge module, the main static converter, and the regulator device are grouped together in a common piece of electrical equipment.

15. A rotorcraft according to claim 1, wherein the at least one parameter identifying progress in the stage of starting the engine is any one of at least the following parameters:
at least one parameter identifying the speed of rotation of the starter and/or the speed at which the turbine is driven in rotation;
a parameter identifying the resisting torque opposed by the turbine against being rotated by the starter; and
a parameter identifying the current delivered to the starter by the onboard network.

16. A rotorcraft comprising:
at least one turboshaft engine with a gas compressor and a turbine, the engine provided with a starter configured to drive the gas compressor while starting the engine;
an onboard electricity network configured to deliver DC to operate the starter;
a main source of electrical energy and a secondary source of electrical energy connected to the onboard electricity network, the secondary source being connected in parallel with the main source, the secondary source comprising a discharge module having a plurality of discharge members that are connected in series; and
an electric circuit connected to the onboard electricity network via a connection bus, the electric circuit delivering DC to operate the starter under a dependency of the electric circuit by regulating the delivery of electrical energy to the starter from the main source and the secondary source to maintain the onboard electricity network at a setpoint voltage during starting;
wherein the electrical circuit comprises a bidirectional DC-DC converter and a regulator device,
wherein the bidirectional DC-DC circuit has a discharge mode and a recharging mode associated with the secondary source, wherein the discharge module of the secondary source is connected in series with the electric circuit via the bidirectional DC-DC converter;
wherein the bidirectional DC-DC converter is provided by a main static converter comprising at least an electrical power architecture and an N phase chopper with phases mutually shifted by $2\pi/N$;
wherein the bidirectional DC-DC converter operates in the discharge mode to control delivery of electrical energy from the secondary source to the onboard electricity network as a function of a value of at least one parameter identifying progress in starting the engine, and such that additional electrical energy is delivered by the secondary source to the onboard network while starting the engine to supplement the electrical energy supplied to the onboard network by the main source;
wherein the bidirectional DC-DC converter operates in the recharging mode to regulate recharging of the secondary source from the onboard network with electrical energy supplied by the main source; and
wherein the regulator device comprises a primary regulation loop and controls the operation of the electrical power architecture of the main static converter, at least by maintaining current equivalence between a current of the electric circuit and a current of the onboard network, regardless of the mode of operation of the discharge module and by monitoring the voltage of the discharge module and the voltage of the onboard network.

17. The rotorcraft of claim 16 wherein the at least one parameter identifying progress in the stage of starting the engine includes a parameter identifying the speed of rotation of the starter and/or the speed at which the turbine is driven in rotation.

18. The rotorcraft of claim 16 wherein the at least one parameter identifying progress in the stage of starting the engine includes a parameter identifying the resisting torque opposed by the turbine against being rotated by the starter.

19. The rotorcraft of claim 16 wherein the at least one parameter identifying progress in the stage of starting the engine includes a parameter identifying the current delivered to the starter by the onboard network.

20. The rotorcraft of claim 16 wherein the regulator device further comprises secondary regulation loops to control the current as a function of the secondary regulation loops respectively identifying a voltage of the onboard network and a voltage of the discharge module.

* * * * *